United States Patent
Shani et al.

(10) Patent No.: US 6,289,017 B1
(45) Date of Patent: Sep. 11, 2001

(54) METHOD OF PROVIDING REDUNDANCY AND LOAD SHARING AMONG MULTIPLE LECS IN AN ASYNCHRONOUS MODE NETWORK

(75) Inventors: Sarit Shani, Tel Aviv; Yoram Shamir, Kiriat Ono; Miki Kenneth, Tel Aviv; Haim Rochberger, Netanya, all of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/087,783

(22) Filed: May 29, 1998

(51) Int. Cl.[7] .................................................. H01L 12/56
(52) U.S. Cl. .............................................................. 370/395
(58) Field of Search ...................................... 370/401, 402, 370/399, 351, 352, 389, 229, 219, 220, 305, 428, 522, 524, 461, 462, 400, 403, 406, 408

(56) References Cited

U.S. PATENT DOCUMENTS

| | | | |
|---|---|---|---|
| 4,823,338 | 4/1989 | Chan et al. | 370/85 |
| 4,975,906 | 12/1990 | Takiyasu et al. | 370/85.13 |

(List continued on next page.)

OTHER PUBLICATIONS

Simpson, W., "IP in IP Tunneling", Request for Comments #153, Oct. 1995, 9 pages.

Swallow, G., "Frame Relay PVC Multicast Service and Protocol Description", FRF.7, Frame Relay Forum Implementation Agreement, Oct. 21, 1994, printed from internet site www.frforum.com, 17 pages.

Cisco—"Packet Services", printed from website http://www/cisco.com/warp/public/732/Tech/pksrv_tc.html, 32 pages, Dec. 1995.

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages 1989.

"All About . . . Multicast Wide Area Network Services", printed from website http://www.starburstcom.com/mcast.html, 11 pages, Feb. 1997.

(List continued on next page.)

*Primary Examiner*—Dang Ton
(74) *Attorney, Agent, or Firm*—McDonnell Boehnen Hulbert & Berghoff

(57) ABSTRACT

A method of providing redundancy and load sharing among multiple LECSs in an ATM network. The method creates and maintains a plurality of lists on each of the switches. Each list is an ordered set of LECSs that combine to create an active LECS list. The network is divided into a plurality of groups wherein each group is assigned one of the active LECS lists. The order of each active LECS list is unique in that no two groups have the same order of LECS. The first LECS on each list has the highest priority and is always the first choice when a request to join a VLAN is received from one of the connected LECs. If the primary lECS fails or cannot be reached for any reason, the switches utilize the second LECS on the list. Splitting up the network into multiple groups and assigning different lists serves to provide load sharing among the LECS. In the event the currently active LECS fails, the next on the list takes overt thus providing redundancy.

15 Claims, 5 Drawing Sheets

U.S. PATENT DOCUMENTS

| | | | |
|---|---|---|---|
| 5,214,646 | 5/1993 | Yacoby | 370/85.14 |
| 5,280,476 | 1/1994 | Kojima et al. | 370/60.1 |
| 5,280,481 | 1/1994 | Chang et al. | 370/85.13 |
| 5,315,582 | 5/1994 | Morizono et al. | 370/16 |
| 5,321,693 | 6/1994 | Perlman | 370/85.13 |
| 5,321,694 | 6/1994 | Chang et al. | 370/85.13 |
| 5,329,527 | 7/1994 | Ujihashi et al. | 370/85.13 |
| 5,329,619 | 7/1994 | Page et al. | 395/200 |
| 5,345,558 | 9/1994 | Opher et al. | 395/200 |
| 5,390,184 | 2/1995 | Morris | 370/94.2 |
| 5,394,402 | 2/1995 | Ross | 370/94.1 |
| 5,408,469 | 4/1995 | Opher et al. | 370/60.1 |
| 5,444,702 | 8/1995 | Burnett et al. | 370/60.1 |
| 5,483,536 | 1/1996 | Gunji et al. | 370/85.14 |
| 5,519,704 | 5/1996 | Farinacci et al. | 370/85.13 |
| 5,548,646 | 8/1996 | Aziz et al. | 380/23 |
| 5,548,723 | 8/1996 | Pettus | 395/200.01 |
| 5,550,816 | 8/1996 | Hardwick et al. | 370/60 |
| 5,550,818 | 8/1996 | Brackett et al. | 370/60 |
| 5,566,014 | 10/1996 | Glance | 359/124 |
| 5,583,865 | 12/1996 | Esaki et al. | 370/397 |
| 5,600,644 | 2/1997 | Chang et al. | 370/404 |
| 5,633,869 | 5/1997 | Burnett et al. | 370/396 |
| 5,659,542 | 8/1997 | Bell et al. | 370/496 |
| 5,666,487 | 9/1997 | Goodman et al. | 395/200.76 |
| 6,021,117 * | 2/2000 | Juniper et al. | 370/252 |

OTHER PUBLICATIONS

Ellington, B. (Ed.), LAN Emulation SWG Drafting Group, "LAN Emulation Over ATM Specification—Version 1.0", ATM Forum, pp. 1–139, (1995).

Novell NetWare Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15–B–22.

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http;//williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel13997.html, 2 pages, Feb. 2, 1997.

* cited by examiner

METHOD OF PROVIDING REDUNDANCY AND LOAD SHARING AMONG MULTIPLE LECS IN AN ASYNCHRONOUS MODE NETWORK

FIELD OF THE INVENTION

The present invention relates generally to data communication networks and more particularly relates to a method of providing, redundancy and load sharing among multiple LECS in an Asynchronous Transfer Mode (ATM) network.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephionique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the user Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by the ATM Forum. The previous Phase 0 draft specification is referred to as Interim Inter-Switch Signaling Protocol (IISP). The goal of the PNNI specifications is to provide customers of ATM network equipment some level of multi-vendor interoperability.

LAN Emulation

Today, most data traffic in existing customer premises networks travels over legacy LANs. It is desirable to permit these legacy LANs and their embedded infrastructure to operate with new ATM networks currently being deployed. To enable an easier migration path to ATM, the ATM Forum has defined LAN Emulation (LANE) specification which allows ATM networks to coexist with legacy systems. The LANE specification defines a way for an ATM network to emulate a logical Ethernet or Token Ring segment, these currently being the most popular LAN technologies.

LANE service provides connectivity between ATM capable devices and legacy LAN capable devices across an ATM network. Since LANE connectivity is defined at the MAC layer, the upper protocol layer functions of LAN applications can continue to function unchanged alter the device joins an emulated LAN. This important feature protects corporate investments in legacy LAN applications. An ATM network can support multiple independent emulated LAN (ELAN) networks. A network may have one or more emulated LANs wherein each emulated LAN is separate and distinct from the others. Emulated LANs communicate via routers and bridges just as they do in physical LANs. The emulated LAN provides communication of user data frames between its users just as in an actual physical LAN.

Emulation over ATM networks. the LANE Version 1.0 standard drafted by the ATM Forum and incorporated herein by reference, defines the LANE architecture and a set of protocols used by the LANE entities. LANE uses a client/server model to provide its services. A diagram illustrating an example ATM network having a plurality of nodes LESs, LECSs and LECs, is shown in FIG. 1. The ATM network, generally referenced 10, comprises an ATM network cloud 19 which includes a plurality of nodes (switches) 12 connected by one or more links. A plurality of LECs 14 labeled LEC #1 through LEC #6 are connected to the switches. A LES 16 labeled LES #1 is also connected to a switch. In addition, a plurality of LECS 15 labeled LECS #1 and LECS #2 are also connected to switches.

The entities defined by the LANE architecture include LAN Emulation Clients (LECs), a LAN Emulation Server (LES), a Broadcast and Unknown Server (BUS) and LAN Emulation Configuration Server (LECS). The LES, BUS and LECS constitute what is known as the LANE Service.

The LAN Emulation Clients (LECs) represent a set of users, as identified by their MAC addresses. A LEC emulates a LAN interface that communicates with higher layer protocols such as IP, IPX, etc. that are used by these users. To achieve this task, the LEC communicates with the LANE Services and to other LECs. LECs communicate with each other and to the LANE Services via ATM Virtual Channel Connections (VCCs). The VCCs are typically Switched Virtual Circuits (SVCs), but Permanent Virtual Connections (PVCs) might also be used for this purpose.

In order for a LEC to participate in an emulated LAN, the LEC may first communicate with an LECS. It may utilize a specific ATM address of the LECS if it knows it, or, as is typically the case, may use the well known address of the LECS to establish communications.

As described previously, the LANE Service comprises several entities: LANE Server (LES), a Broadcast and Unknown Server (BUS) and LAN Emulation Configuration Server (LECS). The LES provides Joining, Address Registration and Address Resolution services to the LECs. Note that a given LES serves only a single emulated LAN.

The LANE BUS is responsible for a distribution of the Broadcast, Multicast and unknown traffic to the LECs which is typically sent by a LEC before the ATM address has been resolved. Note that a given BUS serves only one emulated LAN.

The LECS contains the database used in determining jwhich emulated LAN a device belongs to. Each LEC consults the LECS once, at the time it joins an emulated LAN, to determine which emulated LAN it should join. The LECS assigns the LEC to a given emulated LAN by giving the LEC the ATM address of the LES associated with that particular emulated LAN. Different policies may be utilized by the LECS in making the assignment. The assigment may be based on the LECs physical location, i.e., ATM address, the ELAN name, the MAC address of the LEC or any other suitable criteria. Note that the LECS serves all the emulated LANs defined for the given administrative ATM network domain.

The straightforward implementation of the LANE Version 1.0 specification includes a single LECS for the entire administrative domain and a single LES per emulated LAN. A disadvantage of this implementation is that it suffers from a single point of failure for both the LECS and the LES. Failure of the LECS prevents the LECs from joining an ELAN in the future while failure of the LES takes the entire emulated LAN down.

In these types of implementations, when a LES fails, all the LECs connected to it try to rejoin the emulated LAN by connecting to the LECS. The LECS, however, assigns these LECs to the same non operative LES. The connection fails and the process continues endlessly.

The LANE Version 2.0 draft specification addresses the single point of failure problem for the ELAN by defining, a distributed architecture for the LANE services. Since the clients (LECs) should be effected by the particular implementation used to provide the services, the ATM Forum decided to split the LANE specification into two sub specifications: (1) LAN Emulation User to Network Interface (LUNI) and (2) LAN Emulation Network to Network Interface (LNNI).

The LUNI specification defines the interface between the LEC and the LANE Services and between the LEC and other LECs. The LNNI specification defines the interface between LANE Services entities, i.e., LECSs, LESs, BUSs.

In connection with the LNNI scheme, there may be several LECSs defined per administrative ATM domain in addition to several active LESs defined per ELAN. Each LECS maintains the list of currently active LESs. In case a LES fails, a mechanism is defined to ensure that all the LECSs are notified of the failure in order that none of the LECS assign LECS to non operational LECSs. All the LECs previously connected to the failed LES arc re-assigned by the LECS to other active LESs.

In the draft Version 2.0 of the LANE standard, the services include having multiple LES with each LES having multiple ELANs. The LECs (clients) are apportioned across the LESs. Redundancy is handled by defining several LESs for the same ELAN, i.e., LES #1, LES #2, etc.

Via messags communicated among the LECS in the ELAN using the LNNI protocol, the LECSs know at all times that status of the LECs in the ELAN, i.e., whether the LECS is currently up or down. In addition, each LECS maintains a list of currently active LESs. This provides redundancy for the ELAN in that when a LEC discovers that its LES failed, it goes to the LECS which assigns the LEC to another LES. The LES can assign the LEC to another LES since it has knowledge of which LESs are up or down.

The LNNI proposed model includes protocols between LESs, protocols between LECSs and protocols between LECSs and LESs. These protocols are necessary for (1) synchronization purposes, to insure that all the entities of the same type use the same database and for (2) distribution of LAN Emulation control frames between various entities. Note that the LNNI specification is currently scheduled to be standardized by the end of 1998.

In the distributed model of the LES service, there may be several active LESs per ELAN. An active LES is defined as a LES for which there is at least one LEC connected to it. As long as the subnetwork does not physically split into several subnetworks. the existence of more than one active LES is not valid in the non distributed implementation of the LES. The situation wherein more than one active LES is associated with an ELAN in a single subnetwork is called a split ELAN.

In addition, a mechanism is required whereby the LECs in the network have knowledge of the location of the LECS. In accordance with the LANE standard, all LECs in the network utilize one of the following three alternative means of connecting to the LECS.

The options include (1) using the 'well known' address, (2) using the ILMI protocol to obtain a real address from the ATM switch and (3) using a LECS address preconfigured in the LEC. Prior art techniques to determine the LECS location include configuring all the edge devices with the actual addresses of the LECSs, without the use of a 'well known' address. This requires manually configuring each LEC or adapter in the network. Alternatively the ILMI protocol can be used to configure the edge devices.

Note that the LANE standard does not define how to convert the 'well known' address to an ATM address. An alternative is to use PNNI Phase 1.0 which provides switches with the capability of performing the necessary source routing to the well known address regardless of where it is located.

Further, a redundancy technique is needed in order to provide a back up LECS in the event the primary LECS goes down for some reason i.e., server crash, link failure, etc. If there are more than one LECS in the network, it is desirable to provide load sharing among them. This helps to lower response times for the LECs and minimizes the strain on any one LECS server.

SUMMARY OF THE INVENTION

The present invention is a method of providing redundancy and load sharing among multiple LECSs in an ATM network. The method creates and maintains a plurality of lists on each of the switches. Each list is an ordered set of LECSs that combine to create an active LECS list. The network is divided into a plurality of groups of switches wherein each group is assigned one of the active LECS lists. The order of each active LECS list is unique in that no two groups have the same order of LECS. The first LECS on each list has the highest priority and is always the first choice when a request to join an ELAN is received from one of the connected LECs.

If the primary LECS fails or cannot be reached for any reason, the switches utilize the second LECS on the list. An advantage of the method of the present invention is that, splitting up the network into multiple groups and assigning different lists to each group serves to provide load sharing among the LECS. In the event the currently active LECS fails, the next LECS on the list takes over, thus providing redundancy for the first LECS on the list. In addition, the internal databases of the LECSs are maintained in synchronization.

To aid in understanding the principles of the present invention, an ATM network running the E-IISP protocol will be used as an example. The ATM network uses the well known address of the LAN Emulation Configuration Server (LECS) which, in the example provided herein, is implemented on an ATM switch. Alternatively, the LECS can also be implemented on an edge device as well, i.e., internal PC type NIC module. Note that the E-IISP protocol is an extension of the IISP protocol suitable for use with PNNI Phase 0. The E-IISP protocol is described in more detail in U.S. application Ser. No. 08/697,220 entitled A METHOD OF ROUTING IN AN ASYNCHRONOUS TRANSFER MODE NETWORK, now U.S Pat. No. 5,940,396, similarly assigned and incorporated herein by reference in its entirety.

In normal operation, the LEC devices use the LECS database to obtain the ATM address of the LES. The method provides a 'plug and play' solution whereby the edge devices (edge device or ATM adapters, i.e., NIC) desire to establish a connection to an LECS entity whose address has been previously defined as a 'well known' address. Utilizing the method of the present invention, the network functions to establish a connection to one of the multiple LECS in the network (assuming a plurality of LECS in the network).

Translation of the 'well known' address to an ATM address is performed during the signaling phase of the call process. When a 'well known' address is used in the SETUP request message the first step is that the LEC issues a SETUP request message using the 'well known' address. Next, the first switch, i.e., the edge switch connected to the edge device, to receive the message, performs address translation from the 'well known' address to the actual LECS address of the first LECS on the active list. The switch then routes the SETUP request message to the next hop along the path to the LECS. This continues until the SETUP message reaches the LECS.

It is important to the note that the method utilizes standard network implementation software on the user side, i.e., the LEC. In addition, no configuration step is required on the user side which comprises the majority of devices in the network. Further, the method provides redundancy and load sharing as described above, whereby all the LECS databases are synchronized and all the switches have an active LECS list. The list being generated and distributed by a network management system (NMS) entity. The NMS operates out of band (via Ethernet) or in band (via LANE).

Another advantage is that a fully 'plug and play' solution is provided. The method also provides a manual alternative if the network administrator desires to perform the configuration manually for some reason.

There is provided in accordance with the present invention, in a network consisting of a plurality of network devices, some of which are switches, and an Emulated Local Area Network (ELAN), the ELAN having K LAN Emulation Configuration Servers (LECSs), one or more LAN Emulation Servers (LESs), one or more LAN Emulation Clients (LECs) and a Network Management System (NMS), a method of establishing a connection between a LEC and a LECS, the method comprising the steps of monitoring the plurality of network devices on a continuous basis so as to construct a physical and logical topology of the network from information collected, maintaining a main active list consisting of a maximum of N LECS wherein the active list consists of M LECS at any point in time, wherein M is less then or equal to N, generating M active lists from the main active list whereby each active list contains the same contents but in a unique order to the other active lists, dividing the network into M groups of switches, assigning and storing one of the active lists to each group within the M groups of switches and wherein K, M and N are positive integers.

The step of monitoring comprises the step of collecting status related information by polling via the NMS and standard Management Information Base (MIBs) located in the plurality of network devices. The step of collecting status related information utilizes out of band Ethernet based communications between the NMS and the plurality of MIBs. The step of collecting status related information utilizes in band LAN Emulation based communications between the NMS and the plurality of MIBs.

The method further comprises the steps of detecting the addition of a new LECS, incrementing K by one, updating the database in the new LECS with a corresponding active list, adding the new LECS to the main active list if M is less then N, incrementing M by one, repeating the steps of generating, dividing and assigning and storing and adding the new LECS to a waiting list if M equals N.

The method further comprises the steps of detecting the removal of an old LECS, removing the old LECS from the main active list if it is on it, decrementing M by one, repeating the steps of generating, dividing and assigning and storing and removing the old LECS from a waiting list if the old LECS is not on the main active list.

The method further comprises the steps of detecting the removal of an old LECS, replacing the old LECS from the main active list with a LECS on a waiting list, repeating the steps of generating, dividing and assigning and storing and removing the old LECS from a waiting list if the old LECS is not on the main active list. Each active list generated contains a different LECS as the first entry, thus providing load sharing among the group of M LECS on the main active list. In the event of a failure to establish a connection to a currently active LECS, the next LECS on the corresponding active list is made the active LECS, thus providing redundancy among the LECS on the active list.

The method further comprises the step of a network administrator manually generating the main active list thus determining the order of the LECS and subsequently storing the main active list in each switch in the network. The method further comprises the steps of manually generating one or more active lists from the main active list, dividing the network into one or more groups and storing one active list in each of the groups.

The method further comprises the steps of detecting the addition of a new switch, adding the new switch to one of the M groups of switches and writing a corresponding active list to the new switch. The method further comprises the steps of translating a well known address into a real address.

The step of translating comprises the steps of issuing a SETUP request message from a LEC using the well known address, receiving the SETUP request message by an edge switch, replacing the well known address with the first LECS address on an active list, the active list associated with the group the edge switch is a member of and routting the SETUP request message to a next hop along an associated route.

The method further comprises the step of re-generating the SETUP request message to be sent to the next switch in response to receiving a RELEASE message.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| BUS | Broadcast and Unknown Server |
| CCITT | Comite Consulatif International Telegraphique et Telephonique |
| E-IISP | Extended Interim Inter-Switch Signaling Protocol |
| ELAN | Emulated Local Area Network |
| FDDI | Fiber Distributed Data Interface |
| IISP | Interim Inter-Switch Signaling Protocol |
| ILMI | Interim Local Management Interface |
| IP | Internet Protocol |
| ITU | International Telecommunications Union |
| LAN | Local Area Network |
| LANE | LAN Emulation |
| LEC | LAN Emulation Client |
| LECS | LAN Emulation Configuration Server |
| LES | LAN Emulation Server |
| LNNI | LAN Emulation Network to Network Interface |
| LUNI | LAN Emulation User to Network Interface |
| MAC | Media Access Control |
| MIB | Management Information Base |
| NIC | Network Interface Card |
| NMS | Network Management System |
| PC | Personal Computer |
| PNNI | Private Network to Network Interface |
| PVC | Permanent Virtual Circuit |
| SNMP | Simple Network Management Protocol |
| SVC | Switched Virtual Circuit |
| TCP | Transmission Control Protocol |
| UDP | User Datagram Protocol |
| UNI | User to Network Interface |
| VCC | Virtual Channel Connection |
| VLAN | Virtual Local Area Network |

General Description

The present invention is a method of providing redundancy and load sharing among a plurality of LECSs within an ATM network. The method is particularly advantageous when used with non source routing based networks, e.g., IISP, E-IISP, etc. The method is used to find the actual address from the well known address. The well known address may represent any entity in the network that provides network server application services that are to be shared among nodes and applications on the network such as LECSs.

Figure 1:
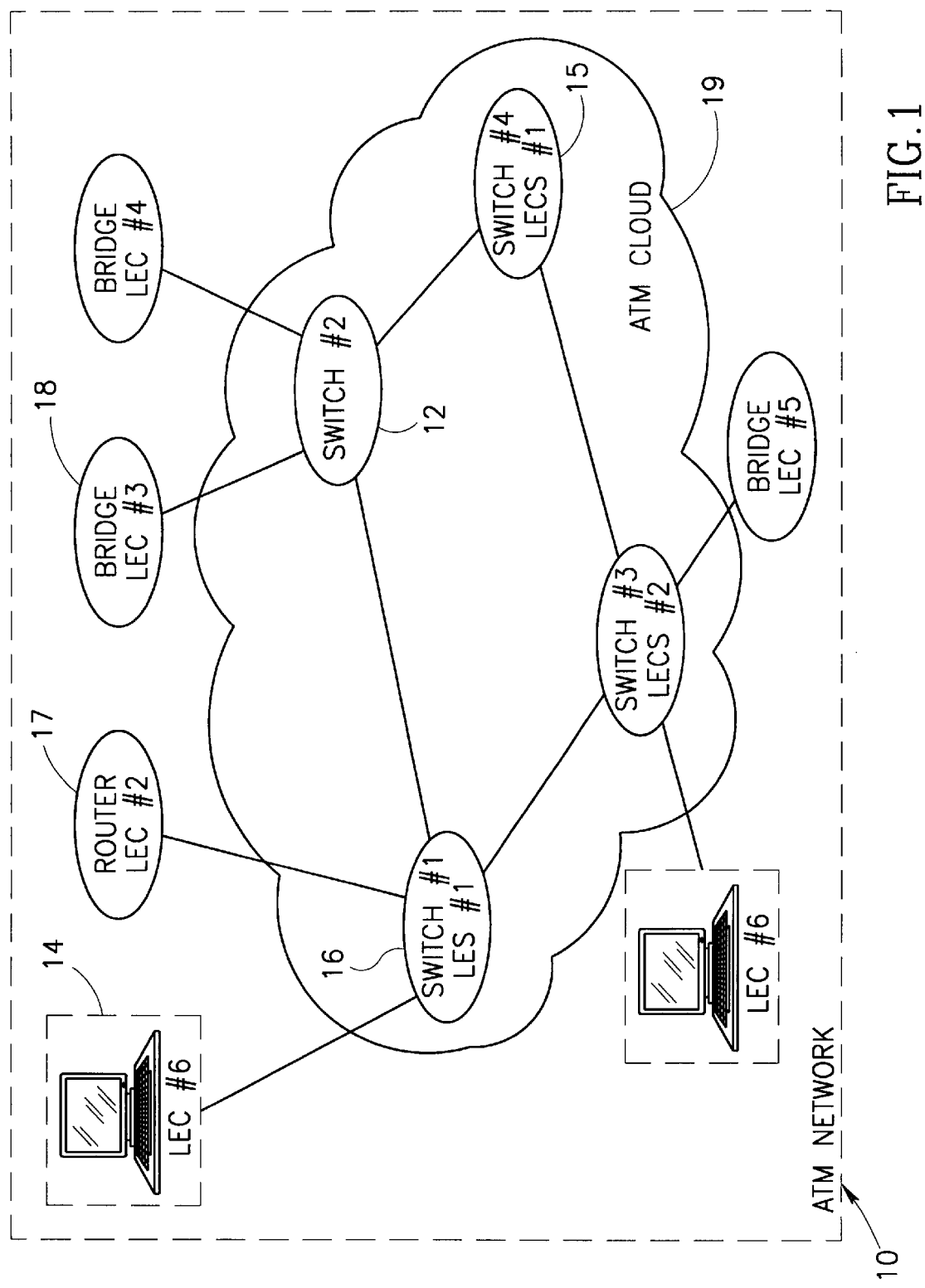
FIG. 1 is a diagram illustrating an example ATM network having a plurality of network elements including multiple LECSs.

A diagram illustrating an example ATM network having a plurality of network elements including multiple LECSs is shown in FIG. 1. The network, generally referenced 10, comprises a plurality of network elements including switches 12 labeled switch #1 through switch #4, a plurality of LECS 15 labeled LECS #1 and LECS #2, and LES 16, routers 17, LECs 14 labeled LEC #1 through LEC #6 and bridges 18.

As defined by the LAN Emulation standard, the address of the LECS comprises either a 'well known' address or a real (actual) address. When the real address is used, all the end users, e.g., LECs, must be configured with that particular address. Alternatively, the address can be obtained using an ILMI request.

In connection with the well known address, the standard does not define how the network should route the call to the chosen LECS. Note that it is desirable to have multiple LECSs in the network for purposes of redundancy and load sharing. Redundancy is needed in order to prevent the failure of a LECS from becoming a single point of failure. Note also that the LANE standard also does not define how multiple LECSs should be implemented. The method described herein provides such a way.

As described previously, the LECS is a configuration server that holds general information for the initialization phase involved in joining a LEC to an ELAN. The end user (LEC) applications first establish a connection to the LECS using the 'well known' address. Once the connection is established, the LEC extracts the required configuration parameters needed to join an ELAN. This solution is suitable for use with IISP and E-IISP protocol based networks or with any protocol that functions to yield 'real' addresses such as PNNI.

The method of the present invention also comprises a network management system (NMS) that is connected to all the switches in the ATM network. The ATM switches and the NMS utilize a standard protocol Such as Simple Network Management Protocol (SNMP) with. The appropriate MIBs are used in the network devices to provide the support required to carry out the method of the invention.

Figure 2A:
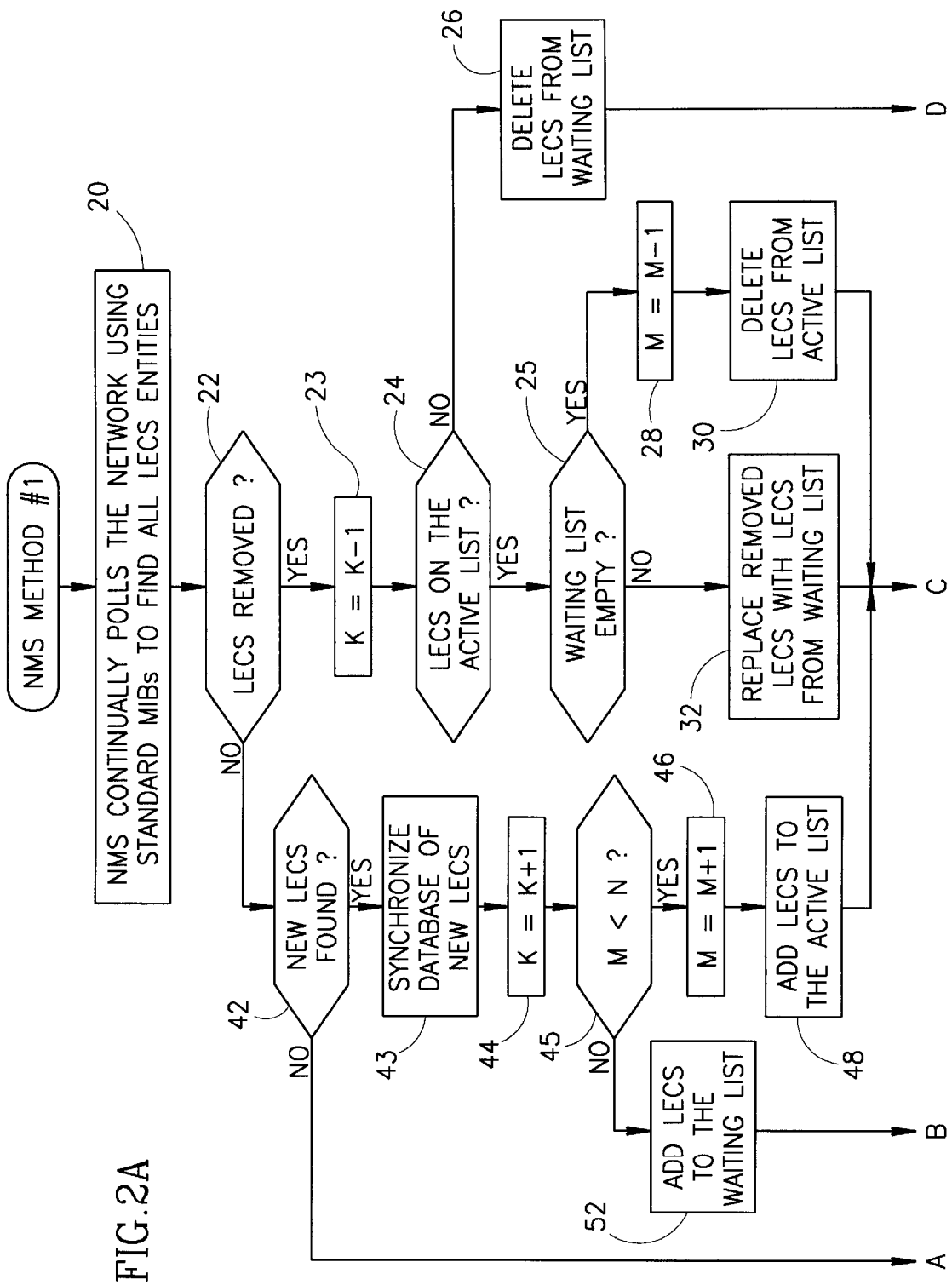
FIGS. 2A and 2B are a flow diagram illustrating a first NMS method performed in accordance with the present invention.
Figure 2B:
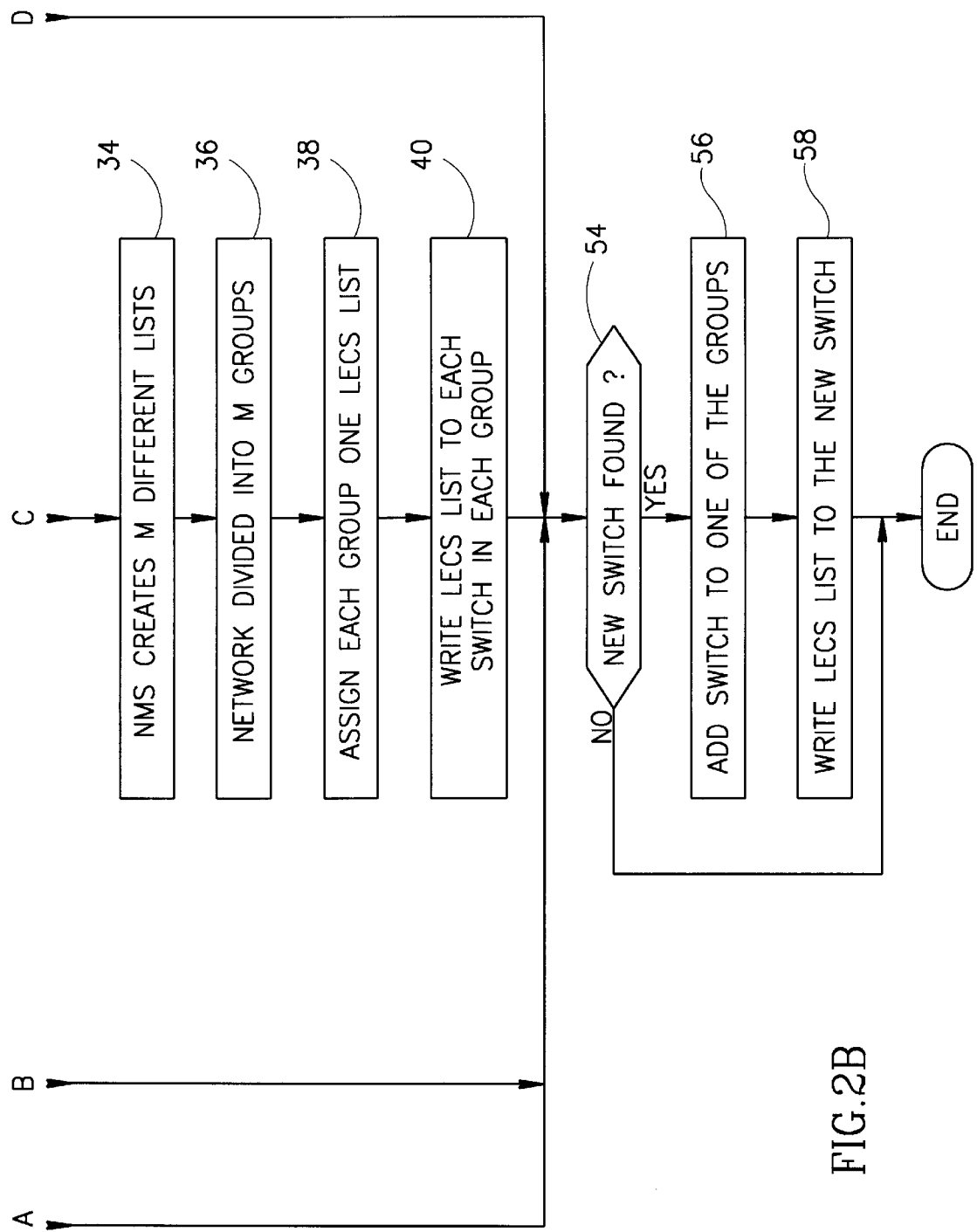

The invention provides two methods that are performed on the NMS: an automatic and a manual method. Thus, a network administrator has a choice as to whether to provide automatic mode or a manual mode. The automatic mode is described first. A flow diagram illustrating a first NMS method (automatic) performed in accordance with the present invention is shown in FIGS. 2A and 2B. In this method, the NMS maintains an active list of a maximum of N LECSs with the current number at any one time denoted by M. Thus, the value M cannot be greater than N. The network comprises a total of K LECSs.

Assuming the active list comprises N LECS, N separate lists are then generated with each list having a unique order of LECSs. The NMS then divides the network into N groups and assigns each group a different list. LECSs added to the network once the active list contains N LECSs are placed on a waiting list.

In the first step, the NMS continually polls the network utilizing standard MIBs to find all LECS entities (step 20). Based on the network information gathered using continuously polling the MIBs in various network devices, the NMS constructs both a physical and a logical topology of the network. File NMS learns the physical and logical topologies including the relationships between them. The logical topology is learned from information collected from the switches in the network. Each switch returns information about the links connected to it, any network services running on the switch, e.g., LES, LECS, any LECs connected to these network services and their actual ATM addresses, etc. The NMS also learns when a link attached to a switch goes down. In addition, the NMS has knowledge of which LECSs, LESs and LECs lost connectivity and which are on either physical side of the network. In addition, the NMS has knowledge of which LECSs, LESs and LECs join the network. From this knowledge, the NMS concludes which LECs lost connectivity from or were added to the network.

In monitoring the network, the NMS utilizes the MIBs maintained in the network devices. A large number of the network devices used to construct networks incorporate some form of network management. In the majority of cases the network management protocol used is the Simple Network Management Protocol (SNMP). The configuration, status and statistical information in a device call be thought of as forming a virtual database. In reality, information in the device can be stored as a combination of switch settings, hardware counters, memory variables, files, etc. This logical database of network management information is known as a Management Information Base (MIB). The NMS obtains status about a device and configures settings and functions within the device via the MIB. The NMS communicates with the MIBs in the managed network device via SNMP. User Datagram Protocol (UDP) is the preferred and recommended transport protocol for SNMP. A more detailed description of the SNMP protocol can be found in SNMP—A Guide To Network Management, Sidnie Feit, McGraw-Hill, Inc., 1995.

The various data elements making up a MIB may include status information about the system or device, any interfaces in the device, neighboring device IDs, etc. For example the MIB in a managed device such as a router may include system ID, number of interfaces, a routing table, traffic counts, error counts, etc. A large number of standard MIBs are currently defined for all types of network entities including switches, routers, bridges, multiplexors, LANE, TCP, IP, UDP, ATM, etc.

In collecting status information from the network the MIB-II elanMIB an atmMIB standard MIBs may be used. The MIB-II includes the if table which contains the status of all physical and logical elements including the status of all physical ports, the LECs, LECSs, LESs, VLANs, etc.

The elanMIB includes elanConfTable, elanLesTable and lecsConfTable. The elanConfTable provides a list of all the names of the ELANs in the network. The elanLesTable comprises a list of all ATM addresses for each ELAN that is specified in elanConfTable. Note that each entry in the elanConfTable can have more than one ATM address associated with each ELAN. The lecsConfTable comprises a list of all available LECSs.

The atmMIB includes atmInterfaceMyNeighborIpAddress which is the IP address of the neighboring system connected to the far end of an ATM interface of the switch to which a NMS can send SNMP messages.

Based on the network information gathered from continuously polling the MIBs in various network devices, the NMS constructs both a physical and a logical topology of the network. The NMS learns the physical and logical topologies including the relationships between them. The logical topology is learned from the information collected from the switches in the network. Each switch returns information about the links connected to it, any network services running on the switch, e.g., LES, LECS. The NMS also learns when a switch is unreachable. This can be caused by a failure of either the link or the switch. If out of band management is used, the NMS can know which occured since the NMS is in contact with the switch. If in band management is used, the NMS may not be able to ascertain whether the link or the switch failed.

From the information gathered by polling, the NMS determines whether any LECSs were removed from the network (step 22). A LECS being removed from the network encompasses both a LECS failure and/or a failure of a link associated connecting the LECS to the network. If it is detected that a LECS was deleted, the value K is incremented by one (step 23). It is then checked whether the removed LECS is on the active LECS list (step 24). If it is not on the active list, the LECS entry is removed from the waiting list (step 26). If the LECS is on the active list, it is checked if the waiting list is empty (step 25). If the waiting list is empty M is decremented (step 28) and the LECS is removed from the active list (step 30). If the waiting list is not empty, the LECS is removed from the list and replaced with the LECS from the waiting list (step 32).

If a LECS was not removed (step 22) it is checked whether a LECS was added to the network (step 42). If not, the method proceeds with step 54. If a new LECS was added, the database of the new LECS is then synchronized to include a current ELAN table and related data (step 43). The value K is then decremented by one (step 44). It is then checked if M is less than $N$, i.e., whether the number of LECSs on the current list has reached the maximum (step 45). If the maximum has not been reached, M is incremented (step 46) and the LECS is added to the active list (step 48). If the list already comprises the maximum number N of LECSs, the LECS is added to the waiting list (step 52).

If a LECS was added (step 48), removed (step 30) or replaced (step 32), a new set of M lists must be generated by the NMS (step 34). The first LECS in each list is different. In addition, the order of LECS is different for each list. The lists comprise the actual ATM addresses of the LECSs.

Next, the NMS divides the switches in the network into M groups (step 36). Each group is then assigned one of the lists of LECSs (step 38). The NMS then writes the lists to the switches in the network (step 40). Each list is written to the switches in the corresponding group. Note that the lists are written to the switches using standard MIBs.

It is then checked whether a new switch was detected by the NMS (step 54). If a new switch was found, it is added to one of the M groups (step 56). The active list corresponding to the group the new switch was assigned to is then written to the new switch (step 58).

When a new LECS is added to the active LECS list, its corresponding database is updated so that it comprises the same list of LESs as the other LECSs. The NMS reads the database from One of the LECSs currently on the active list and writes the ELAN list to the new LECS utilizing(l standard MIBs. A method of synchronizing the database among all the LECS in the network suitable for use with the present invention is described in U.S. Application Serial No. 09/085,918, entitled A NON DISTRIBUTED LAN EMULATION SERVER REDUNDANCY METHOD, filed May, 28, 1998, now U.S Pat. No. 6,223,149, similarly assigned and incorporated herein by reference in its entirety.

Figure 3:
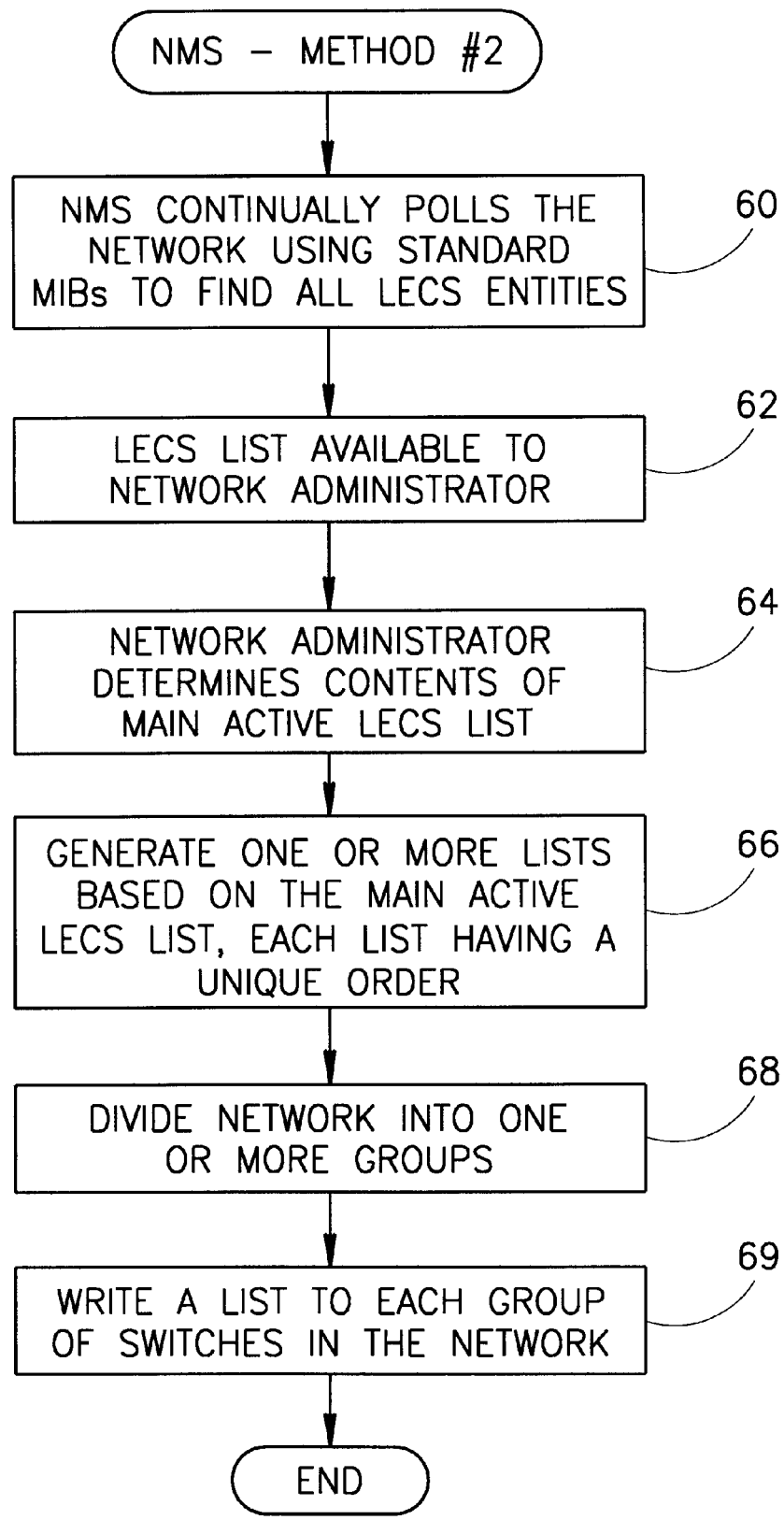
FIG. 3 is a flow diagram illustrating a second NMS method performed in accordance with the present invention.

As stated previously, the method provides both an automatic and a manual mode. The manual mode will now be described in more detail. A flow diagram illustrating a second NMS method performed in accordance with the present invention is shown in FIG. 3. In the first step, the NMS continually polls the network utilizing standard MIBs to find all LECS entities (step 60). This step is similar to that of step 20 described in connection with FIGS. 2A and 2B. Based on the network information gathered using from continuously polling the MIBs in various network devices, the NMS constructs both a physical and a logical topology of the network. The NMS learns the physical and logical topologies including the relationships between them. The logical topology is learned from information collected from the switches in the network. Each switch returns information about the links connected to it, any network services running on the switch, e.g., LES, LECS, any LECs connected to these network services and their actual ATM addresses, etc.

The LECS list is then made available to a network administrator (step 62). Upon request of the network administrator, the NMS provides a list of the available LECSs. The network administrator then chooses the contents of the main active LECS list (step 64). One or more lists based on the main active LECS list is then generated with each list preferably having a unique order (step 66). Note that the network administrator is free to create any number of lists heaving any particular order.

The network is then divided into one or more groups (step 68). The NMS then writes one of the active lists to each (group of switches in the network (step 69). The list comprises the actual ATM addresses of the LECSs. Note that the list is written to the switches using standard MIBs.

Note that in the manual mode, the network administrator can generate a plurality of lists from the main active list generated. The network administrator can decide to generate more or fewer lists than the number of LECS on the main active list.

Figure 4:
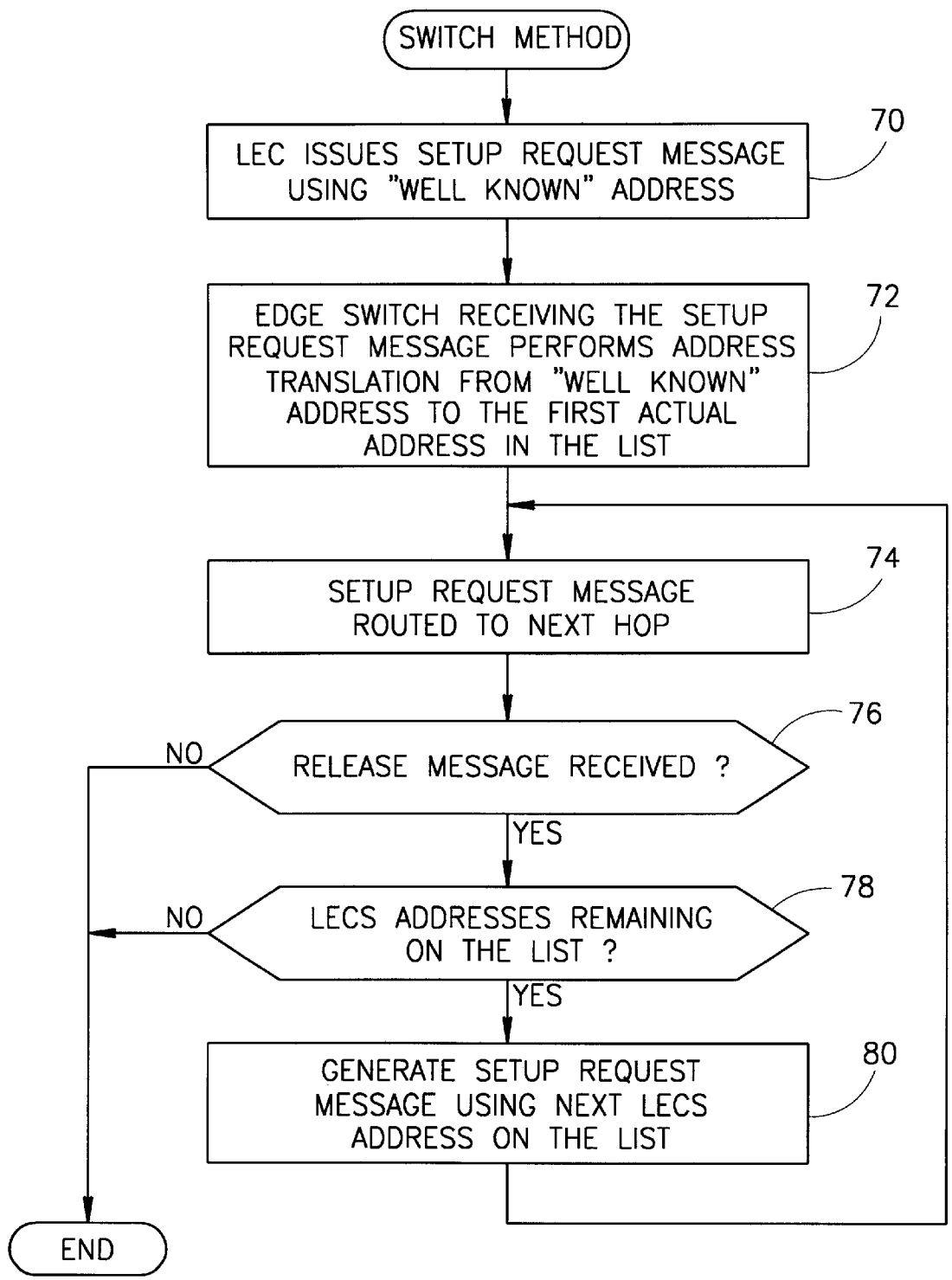
FIG. 4 is a flow diagram illustrating the switch method performed in accordance with the present invention.

A flow diagram illustrating the switch method performed in accordance with the present invention is shown in FIG. 4. The method of routing to the LECS within an ATM switch when a 'well known' address is used in the SETUP request message will now be described. The first step is that the LEC issues a SETUP request message using the 'well known' address (step 70). Next. the first switch, i.e., the edge switch, to receive the message, performs address translation from the 'well known' address to the actual LECS address of the first LECS on the active list (step 79). The edge switch then routes the SETUP request message to the next hop along the path to the LECS (step 74).

If the first switch received a RELEASE message in response to the SETUP request message (step 76), it is checked whether the LECS used in the failed SETUP request message is the last LECS address on the active LECS list (step 78). If it is not the last LECS address, the switch re-initiates a SETUP request message using the next LECS address on the active LECS list (step 80). The process then repeats with step 74 and the new SETUP request message is routed to the next hop along the path. This process loops until the LECS addresses on the active LECS list are exhausted, at which point it is declared that a connection to a LECS cannot be made.

It is important to note that the routing to the real address is done in normal fashion by the ATM switches. In addition, it is important for the invention that all LECSs must have the same database. Database changes must be synchronized among the LECS. This can be achieved using any suitable means. Also, each switch in the network, especially the edge switches, should be configured with the list comprising the real ATM addresses of the LECS. Further, the LECSs other than the first on the list serve as redundant LECSs for that particular group, ready to replace a failed LECS. Note that the LECS other than the first on the list for any particular group serve as the first LECS in other groups in the network.

While the invention has been described with respect to a limited number of embodiments, it will be appreciated that many variations, modifications and other applications of the invention may be made.

What is claimed is:

1. In a network consisting of a plurality of network devices, some of which are switches, and an emulated local area network (ELAN), said ELAN having K LAN emulation configuration servers (LECSs), one or more LAN emulation servers (LESs), one or more LAN emulation clients (LECs) and a network management system (NMS), a method of establishing a connection between a LEC and a LECS, said method comprising the steps of:

monitoring said plurality of network devices on a continuous basis so as to construct a physical and logical topology of said network from information collected;

maintaining a main active list consisting of a maximum of N LECSs wherein said active list consists of M LECSs at any point in time, wherein M is less than or equal to N;

generating M active lists from said main active list whereby each active list contains the same contents but in a unique order to other active lists;

dividing said network into M groups of switches;

assigning and storing one of said active lists to each group within said M groups of switches; and wherein K, M and N are positive integers.

2. The method according to claim 1, where said step of monitoring comprises the step of collecting status related information by polling via said NMS and one or more management information base (MIBs) located in said plurality of network devices.

3. The method according to claim 2, wherein said step of collecting status related information utilizes out of band Ethernet based communications between said NMS and said one or more MIBs.

4. The method according to claim 2, wherein said step of collecting status related information utilizes in band LAN Emulation based communications between said NMS and said one or more MIBs.

5. The method according to claim 1, further comprising the steps of:

detects in the addition of a new LECS;

incrementing, K by one;

updating the database in said new LECS with a corresponding active list;

adding said new LECS to said main active list if M is less then N;

incrementing M by one;

repeating said steps of generating, dividing and assigning and storing; and adding said new LECS to a waiting list if M equals N.

6. The method according to claim 1, further comprising the steps of:

detecting the removal of an old LECS;

removing said old LECS from said main active list if it is on it;

decrementing M by one;

repeating said steps of generating, dividing and assigning and storing; and removing said old LECS from a waiting list if said old LECS is not on said main active list.

7. The method according to claim 1, further comprising the steps of:

detecting the removal of an old LECS;

replacing said old LECS from said main active list with a LECS on a waiting list;

repeating said steps of generating, dividing and assigning and storing; and removing said old LECS from a waiting list if said old LECS is not on said main active list.

8. The method according to claim 1, where each active list generated contains a different LECS as the first entry, thus providing load sharing among the group of M LECSs on said main active list.

9. The method according to claim 1, wherein in the event of a failure to establish a connection to a currently active LECS, the next LECS on a corresponding active list is made the active LECS, thus providing redundancy among the LECSs on said corresponding active list.

10. The method according to claim 1, further comprising the step of a network administrator manually generating said main active list thus determining the order of said LECSs and subsequently storing said main active list in each switch in said network.

11. The method according to claim 1, further comprising the steps of:

manually generating one or more active lists from said main active list;

dividing said network into one or more groups; and storing one active list in each of said groups.

12. The method according to claim 1, further comprising the steps of:

detecting the addition of a new switch;

adding said new switch to one of said M groups of switches; and writing a corresponding active list to said new switch.

13. The method according to claim 1, further comprising the step of translating a well known address into a real address.

14. The method according to claim 13, wherein said step of translating comprises the steps of:

issuing a setup request message from a LEC using said well known address;

receiving said setup request message by an edge switch;

replacing said well known address with the first LECS address on an active list, said active list associated with the group said edge switch is a member of; and routing said setup request message to a next hop along an associated route.

15. The method according to claim 14, further comprising the step of re-generating said setup request message to be sent to the next switch in response to receiving a release message.

\* \* \* \* \*